US011109943B2

(12) United States Patent
Lebreton et al.

(10) Patent No.: US 11,109,943 B2
(45) Date of Patent: Sep. 7, 2021

(54) POWDER-BLASTING DEVICE

(71) Applicant: FERTON HOLDING S.A., Delémont (CH)

(72) Inventors: Etienne Lebreton, Renens (CH); Martin Limon, Rignat (FR); Florent Jean-Claude Georges Beani, Gex (FR); Pierre Fridez, Froideville (CH); Marcel Donnet, Saint Jean de Gonville (CH)

(73) Assignee: FERTON HOLDING S.A., Delémont (CH)

( * ) Notice: Subject to any disclaimer, the term of this patent is extended or adjusted under 35 U.S.C. 154(b) by 77 days.

(21) Appl. No.: 15/555,285

(22) PCT Filed: Mar. 3, 2016

(86) PCT No.: PCT/EP2016/054563
§ 371 (c)(1),
(2) Date: Sep. 1, 2017

(87) PCT Pub. No.: WO2016/142272
PCT Pub. Date: Sep. 15, 2016

(65) Prior Publication Data
US 2018/0036098 A1    Feb. 8, 2018

(30) Foreign Application Priority Data
Mar. 6, 2015  (DE) .................... 10 2015 103 291.0

(51) Int. Cl.
*A61C 3/025*    (2006.01)
(52) U.S. Cl.
CPC .................................. *A61C 3/025* (2013.01)

(58) Field of Classification Search
CPC . A61C 3/025; A61C 3/02; F16L 37/28; F16L 37/24; F16L 37/248; F16L 37/30; F16L 37/47
(Continued)

(56) References Cited

U.S. PATENT DOCUMENTS 2,571,856 A * 10/1951 Freedman .......... A61C 17/0217
                                                     137/551
2,661,537 A    12/1953 Angell
(Continued)

FOREIGN PATENT DOCUMENTS

EP    0097288 A2    4/1984
EP    1159929 A2 * 12/2001 ............. A61C 3/025
(Continued)

OTHER PUBLICATIONS

Wittmann et al., EP 1159959 maching translation of the specification, May 22, 2001.*
(Continued)

*Primary Examiner* — Nicholas D Lucchesi
*Assistant Examiner* — Mirayda A Aponte
(74) *Attorney, Agent, or Firm* — Cantor Colburn LLP

(57) ABSTRACT

A powder-blasting device for cleaning the surfaces of teeth via application with a powder-gas mixture, including a stationary unit having a connection region for a mixing chamber for producing the powder-gas mixture, a hand part having a nozzle device for blasting the powder-gas mixture onto a surface of a tooth, and a joining unit for joining the hand part to the stationary unit wherein the joining unit has at least one joining guide between the stationary unit and the hand part, and wherein a tube section that can be blocked via elastic deformation is arranged in a powder-gas line between the mixing chamber and the nozzle device, wherein the joining unit is detachably joined to the stationary unit and
(Continued)

the lockable tube section is arranged in the detachable joining unit.

14 Claims, 8 Drawing Sheets

(58) Field of Classification Search
USPC .......... 433/88; 251/5; 512/4–10; 601/7, 154, 601/155, 160–163, 169
See application file for complete search history.

(56) References Cited

U.S. PATENT DOCUMENTS 4,492,575 A * 1/1985 Mabille ................ A61C 17/005
251/5
2004/0197731 A1* 10/2004 Swan .................... A61C 3/025
433/88

FOREIGN PATENT DOCUMENTS

| EP | 1972295 A1 | 9/2008 | |
| JP | 2005503833 A | 2/2005 | |
| WO | 3853954 A1 | 12/1998 | |
| WO | WO-0238071 A1 * | 5/2002 | ............. A61C 3/025 |

OTHER PUBLICATIONS

International Preliminary Report on Patentability for corresponding application PCT/EP2016/054563 filed Mar. 3, 2016; dated Sep. 8, 2017.
International Search Report for corresponding application PCT/EP2016/054563 filed Mar. 3, 2016; dated May 19, 2016.

* cited by examiner

POWDER-BLASTING DEVICE

TECHNICAL FIELD

The invention relates to a powder-blasting device for cleaning the surfaces of teeth via application with a powder-gas mixture and to a joining unit for a powder-blasting device.

BACKGROUND

Powder-blasting devices (dental abrasive blasting devices) for cleaning, in particular for powder-blasting or polishing, the surfaces of teeth by means of an abrasive tooth cleaning powder (dental powder) are state of the art. Hereby, the dental powder is used to clean the surfaces of teeth via a gaseous carrier medium, usually air, by blasting it onto the surface of teeth. In addition, usually a liquid medium, usually water, is conducted into the patient's mouth via a separate line. The purpose of the liquid is to prevent the powder from spreading in uncontrolled fashion during the dental treatment and to flush away the removed impurity particles including the powder particles that remain in the patient's mouth.

For example, a powder-blasting device of the kind mentioned above is described in EP 0 097 288 B1. This powder-blasting device comprises a box-shaped base station (stationary unit) with a housing in which a powder container is disposed that holds a dental powder. The dental powder is whirled up as compressed air is introduced, and it is conducted through an outlet opening into a hose line in the housing of the base station. A pinch valve in the hose line serves to interrupt the powder-gas stream. The pinch valve is operated via compressed air which is branched off a compressed-air line ahead of the powder container. A handpiece is connected with the base station via a joining tube that contains two separate lines for the powder-gas mixture and for the water.

Another powder-blasting device is described in EP 1 972 295 B1. This powder-blasting device comprises a base station (stationary unit) with an accommodation section for an exchangeable powder container which comprises a swirl chamber for producing a powder-gas mixture. A handpiece is connected with the base station via a connecting line. The base station contains a control panel for setting operating parameters such as the strength of the powder jet or of a water jet.

For the optimal handling of a powder-blasting device, it is desirable that the treatment can be started and ended with a minimum of delay. For interrupting the powder-gas stream, known powder-blasting devices use a pinch valve such as described in EP 0 097 288, which is arranged in the stationary unit, namely between the powder container and the connector of the joining line that leads to the handpiece. For example, the pinch valve can be operated by a magnetic valve (solenoid) or a pneumatic cylinder. In a pinch valve, an elastic piece of hose is squeezed and thus closed, such that the stream of the powder-gas mixture is blocked. In comparison with other kinds of valves, a pinch valve has the advantage that dead zones, which are unfavorable features in a powder stream, are avoided, and that the liquid or the powder-gas mixture can be regulated antiseptically, i.e. that it does not come in contact with any valves or the like.

However, it is a disadvantage of pinch valves that due to the abrasive effect of the dental powder and the repeated mechanical squeezing of the hose, there is wear and tear which can lead to the failure of the pinch valve. This causes the powder to enter the housing of the stationary unit.

It was therefore suggested to do without pinch valves in the powder line (i.e. the line for the powder-gas mixture). Instead it was suggested to interrupt the supply of compressed air into the powder chamber to end the dental treatment. This can be done with conventional shut-off valves. Yet this leads to the disadvantage that the treatment is not stopped immediately since the pressure in the powder chamber first has to be reduced, which can take a few seconds. The same applies to the beginning of a treatment when the pressure first has to be built up in the powder chamber.

BRIEF SUMMARY

Provided herein is a powder-blasting device and components thereof which make the powder-blasting device especially reliable and long-lasting while it is as comfortable to handle as possible.

The inventive powder-blasting device for cleaning the surfaces of teeth by applying a powder-gas mixture comprises a stationary unit (base station) with a connecting section for a mixing chamber for producing the powder-gas mixture, a handpiece with a nozzle device for blasting the powder-gas mixture onto a surface of teeth, and a joining unit for connecting the handpiece to the stationary unit. The joining unit is provided with at least one joining guide between the stationary unit and the handpiece. A (lockable) tube section is arranged in a powder-gas line between the mixing chamber and the nozzle device. The invention is characterized by the joining unit being detachably connected with the stationary unit and that the lockable tube section is disposed in the detachable or disconnectable joining unit.

The inventive joining unit for a powder-blasting device for cleaning the surfaces of teeth by applying a powder-gas mixture is designed to connect a handpiece of the powder-blasting device with a stationary unit (base station) of the powder-blasting device and comprises a joining guide to be disposed between the stationary unit and the handpiece. It is provided that the joining unit comprises a connection region or coupling section for the detachable connection with the stationary unit and that the joining unit comprises a powder-gas line for conducting a powder-gas mixture, with a tube section (line section) that is lockable by means of elastic deformation.

It can be regarded as a first basic idea of the invention that the joining unit is detachably (disconnectably, removably) connected or connectable with the stationary unit. This accomplishes that in case of a defective pinch valve, especially a defective lockable tube section, the stationary unit requires no complicated repair, but only the joining unit can be exchanged. It is therefore much faster and less expensive to rectify the defect. Furthermore, the arrangement of the lockable tube section outside the stationary unit prevents that powder enters the interior of the stationary unit in which electronic components, especially control elements, are usually housed. Finally, a user can more easily detect the defect, since the user can see powder being discharged from the joining unit when the pinch valve (the lockable tube section) becomes leaky.

It can be regarded as a second basic idea of the invention that a pinch valve can be at least partially integrated into the joining unit. A component of a pinch valve is a blockable (lockable) elastic tube section (line section). According to the invention, at least that component of the pinch valve is arranged between the stationary unit and the handpiece.

Another component of a pinch valve is a means or an arrangement for the—especially controlled—compressing or squeezing of the tube section which preferably is also arranged in the joining unit, but which can always also be arranged in the stationary unit. When an arrangement in the stationary unit is provided, the means act upon the elastic tube section located in or on the joining unit.

For a more cost-effective exchange of the joining unit, the latter is not only detachably (disconnectably, removably) connected with the stationary unit, but also with the handpiece. Thus the joining unit including the lockable tube section of the pinch valve can be exchanged separately while the stationary unit as well as the handpiece can be retained.

Preferably, the in particular flexible (bendable) joining guide of the joining unit, which, for example, can be a connecting hose, a connecting cable or another kind of guide for a flexible line, contains a first line (supply line) for the powder-gas mixture (powder-gas line, powder line) and a second line (supply line) for a liquid (liquid line). The two lines are connected to separate nozzles of a nozzle device of the handpiece such that the liquid can be directed at the surface of teeth separately from the powder-gas stream. As is known to persons skilled in the art, the liquid stream serves to remove the powder after it strikes the surface of teeth and/or to control the spreading of the powder during the dental treatment. For this, the nozzle for the liquid jet can surround the powder-gas nozzle in annular fashion.

To accommodate the lockable tube section, the joining unit preferably comprises a housing body (housing) connected with the joining guide. The housing body, which in contrast to the joining guide is rigid or inherently stable, serves to accommodate the elastic, lockable tube section and sometimes also other components of the pinch valve such as a pressure chamber for a control fluid, in particular for control gas, and/or a pinch element for compressing the lockable tube section. Thus, it can also be regarded as a considerable aspect of the invention that the joining unit serving as the connection between the handpiece and the stationary unit is not only provided with a flexible (bendable) joining element (connecting cable, connecting hose), but also with a housing body suitable for holding and accommodating components of a pinch valve, especially of a lockable elastic tube section of a powder-gas line. For this, the housing body comprises a rigid housing. The elastic tube section is held in the housing section or housing with at least one rigid holding element, in particular a rigid line section. The elastic lockable tube section can also be clamped between holding elements (rigid line sections). Preferably, the lockable or squeezable elastic tube section of the pinch valve is formed in one piece with a line section of the powder-gas line in the joining guide that leads to the handpiece.

For the detachable connection of the joining unit with the stationary unit, it is preferable when the joining unit is disposed with a first coupling sector (joining sector, connection region) for coupling (connecting) to a corresponding second coupling sector (joining sector, connection region) of the stationary unit. It is particularly preferable when the first coupling sector is disposed on the housing body of the joining unit such that the housing body of the joining unit can be directly connected or coupled to the housing of the stationary unit. Thus the joining unit comprises a housing body with a coupling sector for coupling to the stationary unit or the housing of the stationary unit, and joining guide with a powder-gas line and preferably in addition a liquid line connected to the handpiece. If need be, the coupling sectors can also be formed on independent coupling parts of the stationary unit and/or the joining unit.

Preferably, the pinch valve is operated with a control fluid, especially a compressed gas and in particular with compressed air. The control fluid or the compressed air is conducted to the joining unit by the stationary unit. Preferable, for this purpose, a coupling for a control element for controlling the pinch valve is formed between the joining unit and the stationary unit, in particular a line coupling for a control fluid line. Preferably, the line coupling comprises suitable coupling elements in the first coupling section or coupling part (the joining unit) and the second coupling section or coupling part (the stationary unit). Preferably, the joining unit comprises a compressed-gas line, in particular a compressed-air line which can also be called control fluid line. Through the compressed-gas line, a control fluid (compressed air) is conducted to the pinch valve in the joining unit which serves as the on/off command or opening/closing command for the pinch valve. Alternatively, the pinch valve can also be activated electromechanically.

It is also preferred that between the joining unit and the stationary unit a line coupling for a liquid line is formed to conduct the liquid from the stationary unit to the joining unit and via this unit to the handpiece.

It is also preferable according to the invention that a line coupling for a powder-gas mixture is formed between the joining unit and the stationary unit. In one advantageous embodiment, the mixing chamber is disposed on the stationary unit, i.e. forms part of the stationary unit. The powder-gas mixture leaves the mixing chamber via a powder-gas line and via the line coupling reaches the removable joining unit which contains the lockable line section or tube section of the pinch valve.

The joining zone (coupling zone) between the stationary unit and the joining unit also preferably contains a liquid (for dental cleaning) and/or a powder-gas connection (for dental cleaning) and/or an air connection (compressed-air connection) for operating (activating) the pinch valve.

The mixing chamber can also form a unit together with the lockable tube section (and preferably with the handpiece), a unit which is exchangeably coupled with the stationary unit. In that case, in which the mixing chamber can be regarded as part of the removable joining unit, a line coupling is formed between the joining unit and the stationary unit for a compressed-air line to the mixing chamber. In that case, the compressed-air line conducts compressed air to the mixing chamber. The mixing chamber can be accommodated in the housing body of the joining unit or integrated in the housing body or designed as a separate element of the joining unit.

Preferably, the joining unit comprises a control space for a pressurized control fluid and/or a pinch element or control element (such as a peg, a pressurized ball, etc.) for shutting off the tube section. In particular, the control space (fluid space, hollow space, pressure space) or the control element is disposed in the housing body of the joining unit. In particular, the control fluid is compressed air. The lockable tube section, which forms a shut-off element of the pinch valve, can be squeezed or compressed and thus shut off by applying pressure to it with the control fluid. As an alternative, the tube section can be squeezed or closed (locked) with a squeezing or control element, in particular a plunger switch. It can be activated by means of a control fluid, in particular compressed air.

In a preferred embodiment, the invention provides that the stationary unit comprises a control device, in particular a controllable valve, in particular a magnetic valve, for regulating the control fluid, in particular compressed air. Thus, the stationary unit contains an arrangement for providing a compressed gas, in particular compressed air, for activating the blockage of the tube section which can be regarded as part (a component) of the pinch valve. In particular, this arrangement (activation arrangement) in the stationary unit can deliver an on/off command, in particular through the presence or absence of compressed air (provision or non-provision of compressed air in a squeezing element or in a pressure chamber of the pinch valve). The compressed air can be transferred via a line coupling (compressed-gas coupling, control coupling) from the stationary unit to the joining unit where the lockable elastic tube section or the squeezing element/pressure element for pinching (squeezing, closing) the tube section and/or a pressure space are located. The squeezing function or activation of the pinch valve is also divided into two subsystems: The activation command is provided in the stationary unit, for example via a valve, for example by disposing compressed air. The tube section of the pinch valve is closed in the removable joining unit, for example by a cylinder or a pressure or squeezing element.

According to an alternative embodiment of the invention, the control element is seated in the stationary unit and engages in or acts upon the joining unit to block the tube section. Thus, the control of the control element (such as pneumatic, electrical or electromagnetic) takes place in the stationary unit while the critical tube section is in or on the removable joining unit. This provides the two significant advantages that the joining unit can be manufactured more cost-efficiently since it contains fewer parts, and that there is no need for another connection for regulating the control element (such as a pneumatic control line).

Preferably, the joining unit comprises one locking mechanism/one locking arrangement for the positive and/or frictional connection with the stationary unit or for mechanically locking it to the stationary unit. For example, the locking arrangement can comprise finger-shaped or hook-shaped locking elements. For example, the joining unit can be interlocked with the stationary unit, especially such that the unit can only be detached again when an unlocking arrangement is activated.

Preferably, there is an unlocking arrangement for the targeted unlocking of the connection between the joining unit and the stationary unit. Preferably, in a coupled state, the joining unit and the stationary unit are coupled/connected with each other such that the coupling/connection can (only) be unlocked by activating the unlocking arrangement. This ensures that the joining unit and the stationary unit cannot be separated from each other without activating the unlocking arrangement. This provides a secure connection.

According to another alternative embodiment of the invention, the stationary unit comprises—in addition to the connecting region for the mixing chamber for producing the powder-gas mixture, the handpiece with a nozzle device for blasting the powder-gas mixture onto the surface of teeth, and the joining unit for connecting the handpiece with the stationary unit—at least one joining guide between the stationary unit and the handpiece, and the powder-gas line between the mixing chamber and the nozzle device with the lockable tube section that can be locked by means of elastic deformation, wherein the joining unit is detachably connected with the stationary unit and wherein means are provided for regulating a liquid passage in the detachable joining unit. These means can be provided additionally or alternatively to the tube section of the powder-gas line in the joining line, which is lockable by means of elastic deformation.

According to an alternative of the invention, the means to regulate the liquid passage comprise at least one electrical or pneumatic valve arranged in the detachable joining unit.

In the same way as with the tube section for the powder-gas mixture, which is lockable by means of elastic deformation, a similar line can be provided for the liquid supply and its regulation or control, in which case leaks in this line would not damage the stationary unit but at the most only the joining unit. As described above, the joining unit can contain only the lockable tube section necessary for the liquid supply, while the control means are in the stationary unit, or both are in the joining unit, in which case suitable couplings would be necessary for the control (such as an electrical or pneumatic connection).

According to an alternative of the invention, if the control means are housed in the stationary unit, the pneumatic valve is controlled via a control peg housed in the stationary unit. In any event, this peg protrudes so far into or against the joining unit that the tube section blockable by means of elastic deformation is blocked by the control peg.

BRIEF DESCRIPTION OF THE DRAWINGS

Below, the invention is described further by means of preferred embodiments which are shown in the attached Figures, where.

Elements which are the same or have the same effect are given the same reference numbers in all the Figures.

DETAILED DESCRIPTION

Figure 1:
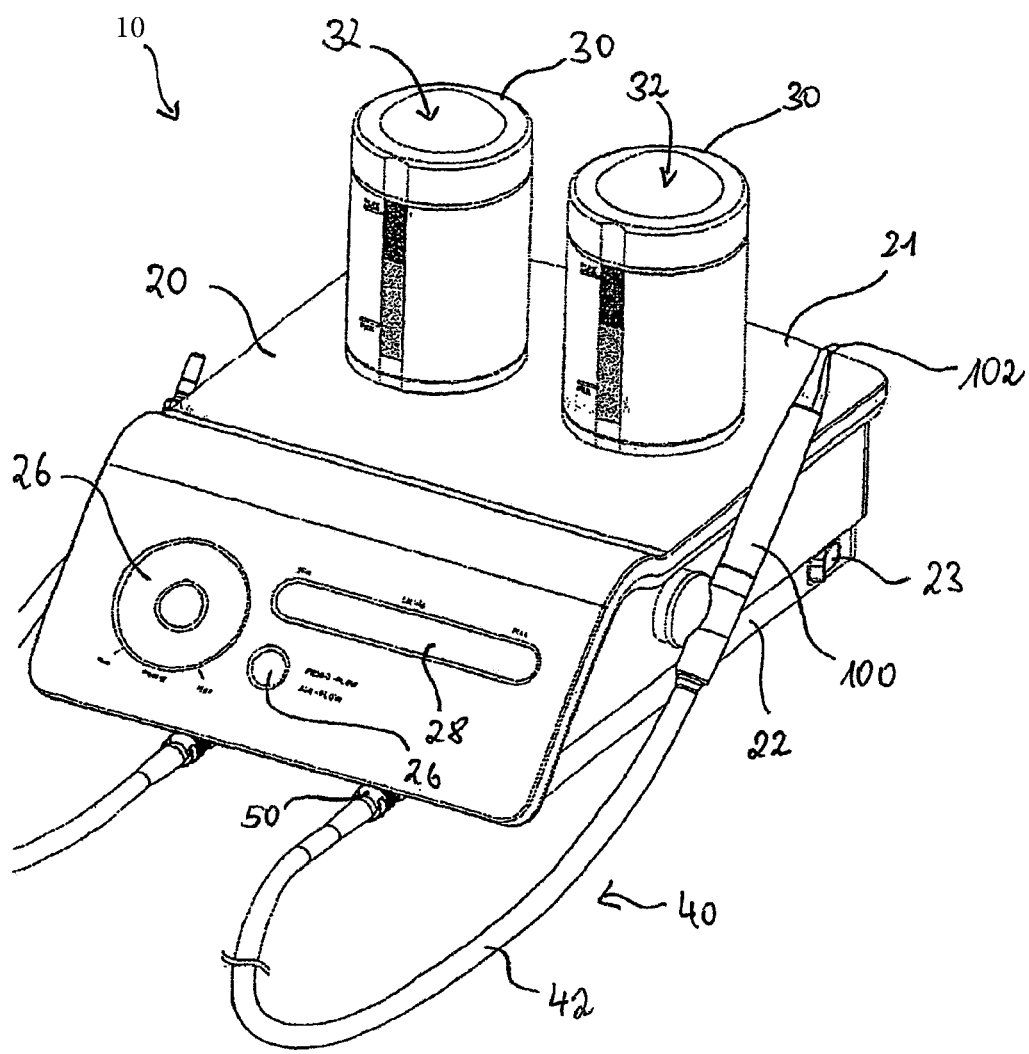
FIG. 1 shows an example of an embodiment of an inventive powder-blasting device.

FIG. 1 shows the basic design of a powder-blasting device 10 according to the invention. The powder-blasting device 10 comprises a stationary unit 20 which can also be called the base station. The stationary unit 20 comprises a housing 21 with a pedestal section 22 for setting the base on a surface such as a table. The housing 21 accommodates control elements for regulating the operation of the powder-blasting device 10, in particular the electronic components. The stationary unit 20 comprises means for supplying compressed gas, in particular compressed air, to a mixing chamber 32 in which a powder-gas mixture, i.e. a powder-air mixture, is produced by means of the compressed gas or compressed air. Furthermore, the stationary unit 20 can comprise an on/off switch 23 as shown in FIG. 1. Finally, the stationary unit 20 may have a control panel or an input arrangement 26 for entering commands and/or a display arrangement 28 for displaying status information. The stationary unit 20 comprises a connecting region for connecting a powder container 30 in which a dental powder for cleaning the surfaces of teeth is accommodated. The powder container 30, which can be regarded as part of the stationary unit 20 or as a separate element, comprises a mixing chamber 32, in particular inside a container housing of the powder container 30. In the mixing chamber 32, the powder (dental powder) is swirled around with compressed air, and at a discharge opening of the mixing chamber 32, a powder-gas mixture or a powder-air mixture is held ready. A powder-gas line 44 leads from the mixing chamber 32 via a joining unit 40, which will be described in detail below, to a handpiece 100, which is held in the mouth of the patient during the treatment.

The joining unit 40, which can also be called the tube unit or cable unit, comprises in a conventional way a flexible joining guide 42 such as a (flexible) joining cable or a (flexible) joining tube, between the stationary unit 20 and the handpiece 100. Inside the joining guide 42 is the powder-gas line 44 (or a section thereof) and a liquid line 46 with which a liquid, usually water, is conveyed to the handpiece 100. The handpiece 100 comprises a nozzle device 102, which comprises separate nozzles for the powder-gas mixture and the liquid, respectively. In addition to the flexible joining guide 42, the joining unit 40, which connects the stationary unit 20 with the handpiece 100, comprises a housing body 50 with a housing 52, preferably in cylindrical form. In the shown embodiment, the housing body 50 and the housing 52 are coupled to the stationary unit 20 (connected to it). For this purpose, the housing 52 comprises a first coupling section or connecting region 64. The stationary unit 20 comprises a second coupling section or connecting region 34 which can be coupled or connected to the first coupling section 64. The second coupling section 34 is formed by a coupling part 36 disposed on the stationary unit 20. The housing 52 of joining unit 40 can be locked to housing 21 of the stationary unit by means of locking elements 82, especially such that an unlocking arrangement 38 must be activated to unlock it.

At least one part of pinch valve 90 is disposed in the housing 52 or housing body 50 of the joining unit 49. In other words, the pinch valve 90 is at least partly integrated in joining unit 40. Pinch valve 90 comprises a blockable elastic tube section 92 of powder-gas line 44 which is disposed in joining unit 40, in particular in housing body 50 or housing 52. Pinch valve 90 also comprises a squeezing element or control element 94, which can also be called control peg, for pinching (squeezing/locking) the tube section 92. Preferably, squeezing element 94 is also disposed in housing 52 or at least protrudes into this housing.

The squeezing element 94 is activated by means of compressed gas, especially compressed air. The compressed air is supplied in the stationary unit 20 and transferred to the joining unit 40 via a coupling described in detail below.

Figure 3:
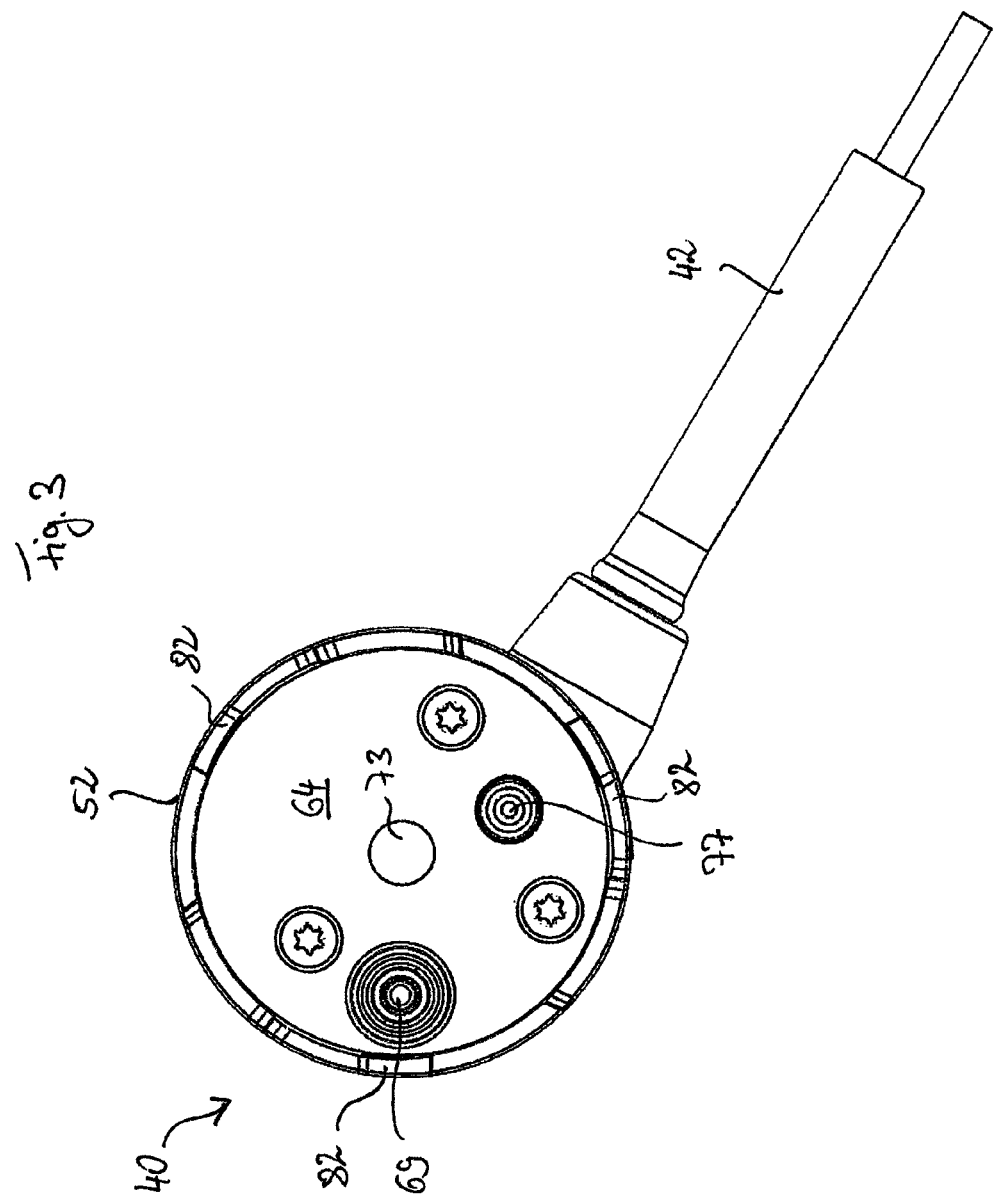
FIG. 3 shows a top view of the joining unit according to FIG. 2.
Figure 4:
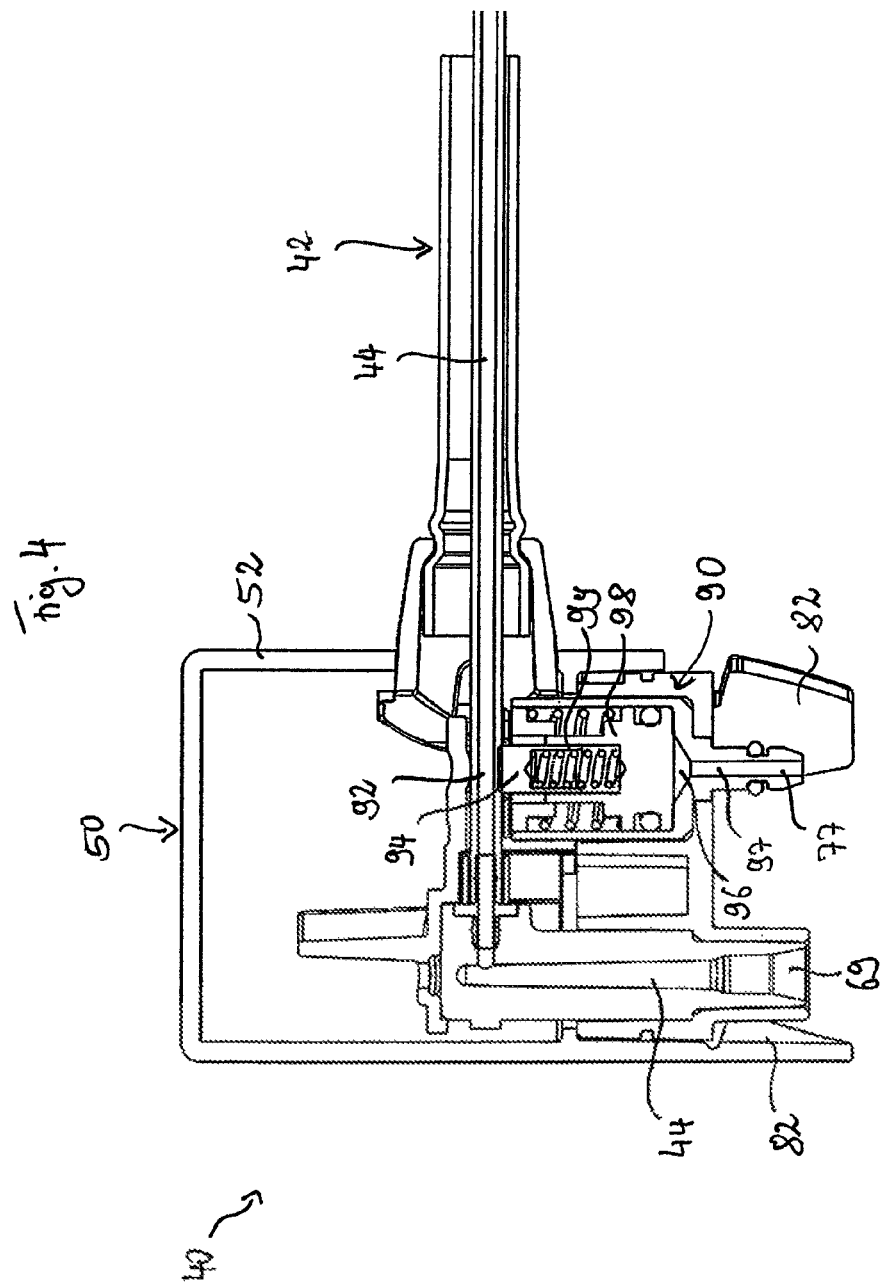
FIG. 4 shows a sectional view of the joining unit according to FIG. 2.
Figure 5:
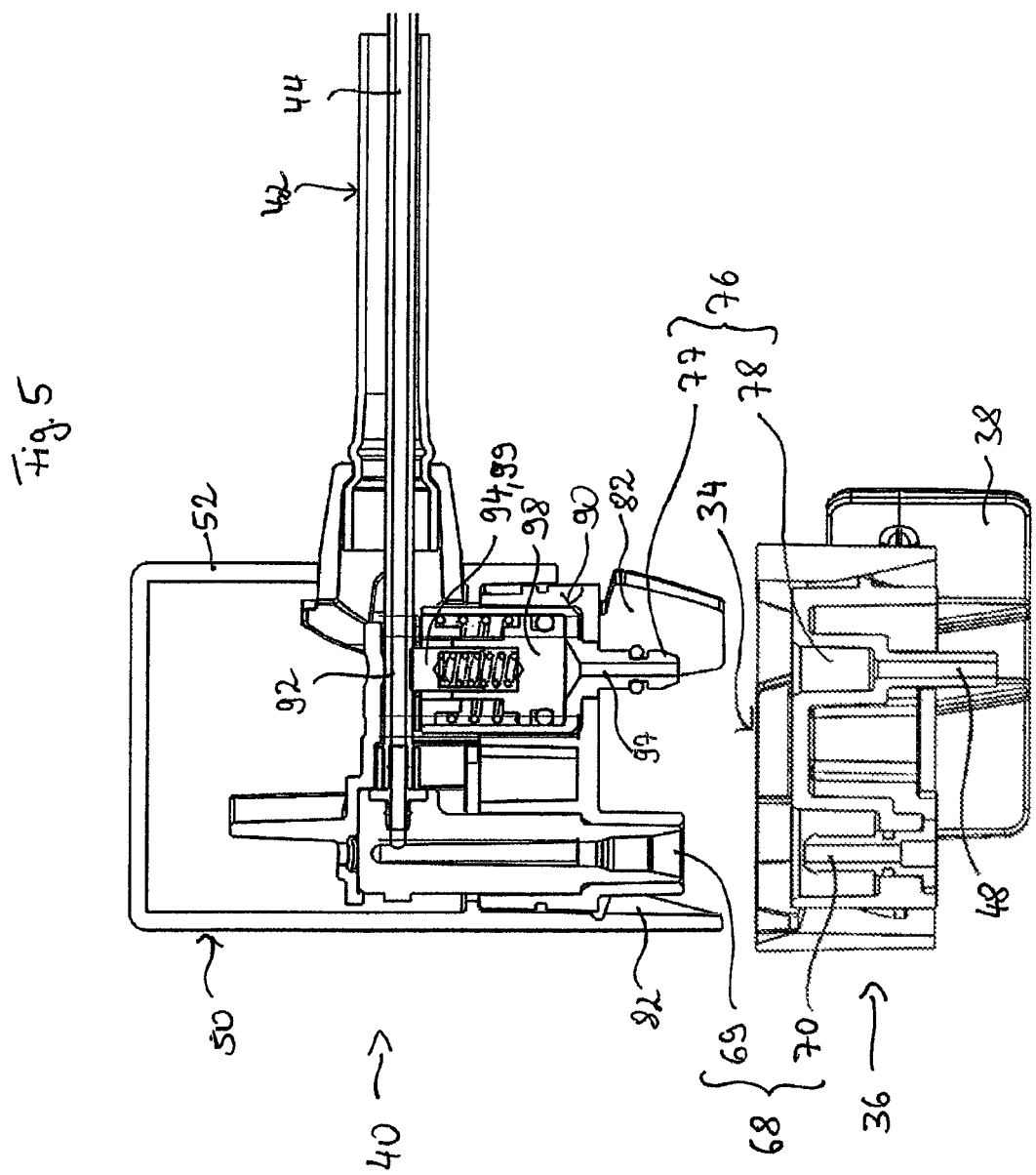
FIG. 5 shows the joining unit according to FIG. 4 together with a coupling part of a stationary unit in an uncoupled state.
Figure 6:
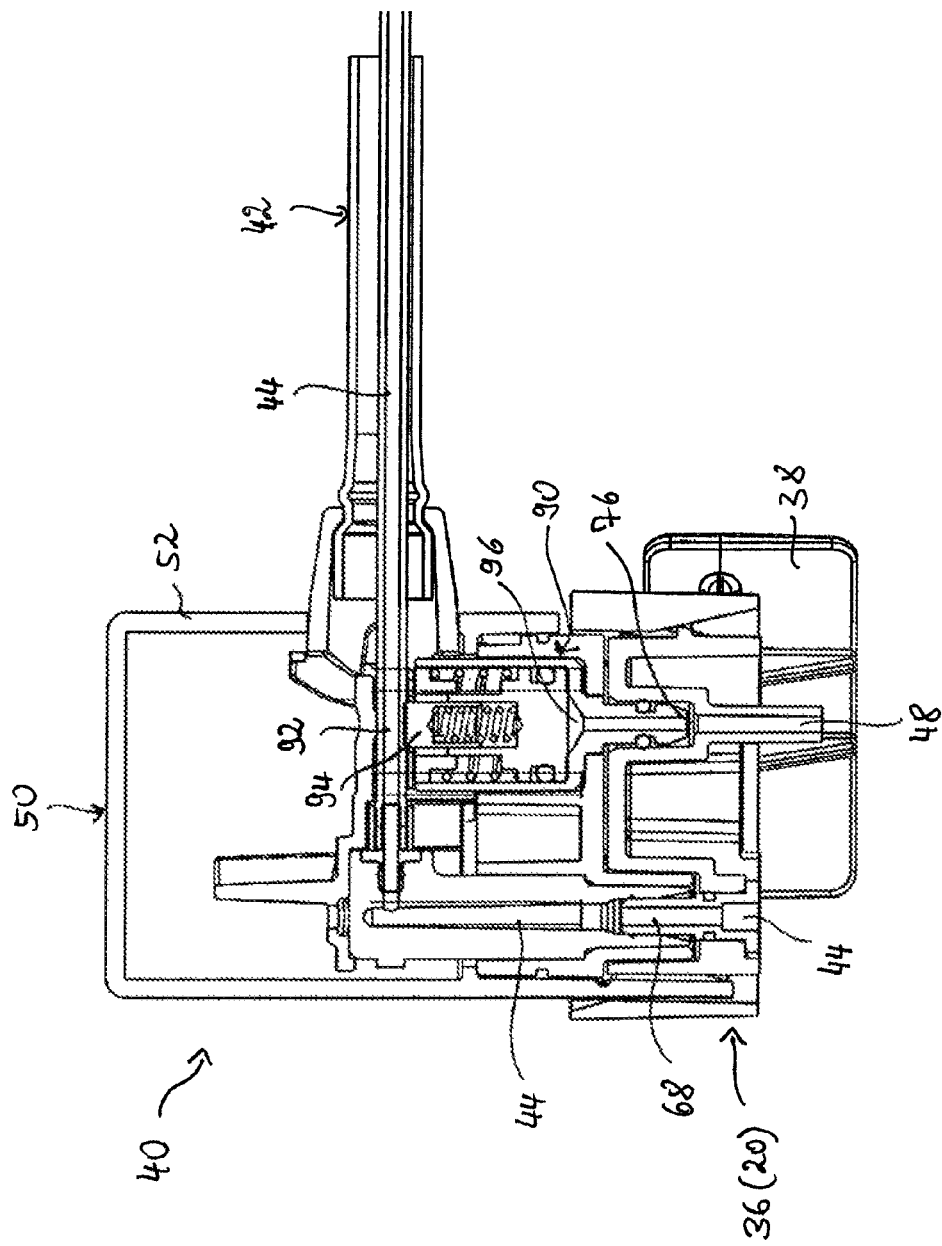
FIG. 6 shows the arrangement according to FIG. 5 in a coupled state.

Below, the joining unit 40 with the joining guide 42 and the housing body 50 is being described in detail with reference to FIGS. 2 to 4. FIGS. 5 and 6 show the coupling of joining unit 40 with the stationary unit 20, in particular with the coupling part 36 of the stationary unit 20. The housing body 50, which in particular is cylinder-shaped, has a front face on which the first coupling section 64 is formed. The first coupling section 64 comprises a first coupling element 69 for forming a line coupling 68 for the powder-gas line 44. The first coupling section 64 also comprises a third coupling element 73 for forming a line coupling 72 for the liquid line 46. In addition, the first coupling section 64 comprises a fifth coupling part 77 for forming a control coupling 75 such as a line coupling for triggering the pinch valve 90 or activating or for triggering the squeezing element 94. The control coupling 75 in the shown embodiment of the invention is also a line coupling, namely to transfer compressed gas, in particular compressed air, from the stationary unit 20 to the joining unit 40.

The second connecting section 34 or the coupling part 36 of the stationary unit 20 comprises a second coupling element 70 for coupling with the first coupling element 69, a fourth coupling element 70 for coupling with the third coupling element 73 and a sixth coupling element 78 for coupling with the fifth coupling element 77. Together, the first and second coupling elements 69, 70 form the line coupling 68 for the powder-gas line 44. The third coupling element 73 and the fourth coupling element 74 form the line coupling 72 for the liquid line 46. The fifth and sixth elements 77, 78 form the control coupling 76. Preferably, the control coupling 76 is a line coupling for compressed air for activating the squeezing element 94 of the pinch valve 90.

The pinch valve 90 in joining unit 40 comprises a compressed-air connection 97 to a control space 96 which is connected via the control coupling 76 to a control fluid line (compressed-air line) 48 in the stationary unit 20. A first movable element 98 is pushed into a release position in which the tube section 92 is open. By means of applying pressure against the elastic force, the first movable element 98 is pushed into a squeezing or closing position in which the tube section 92 is closed. The also spring-loaded second movable element 99 within the first movable element 98 prevents that too much pressure is applied to the tube section 92.

Figure 2:
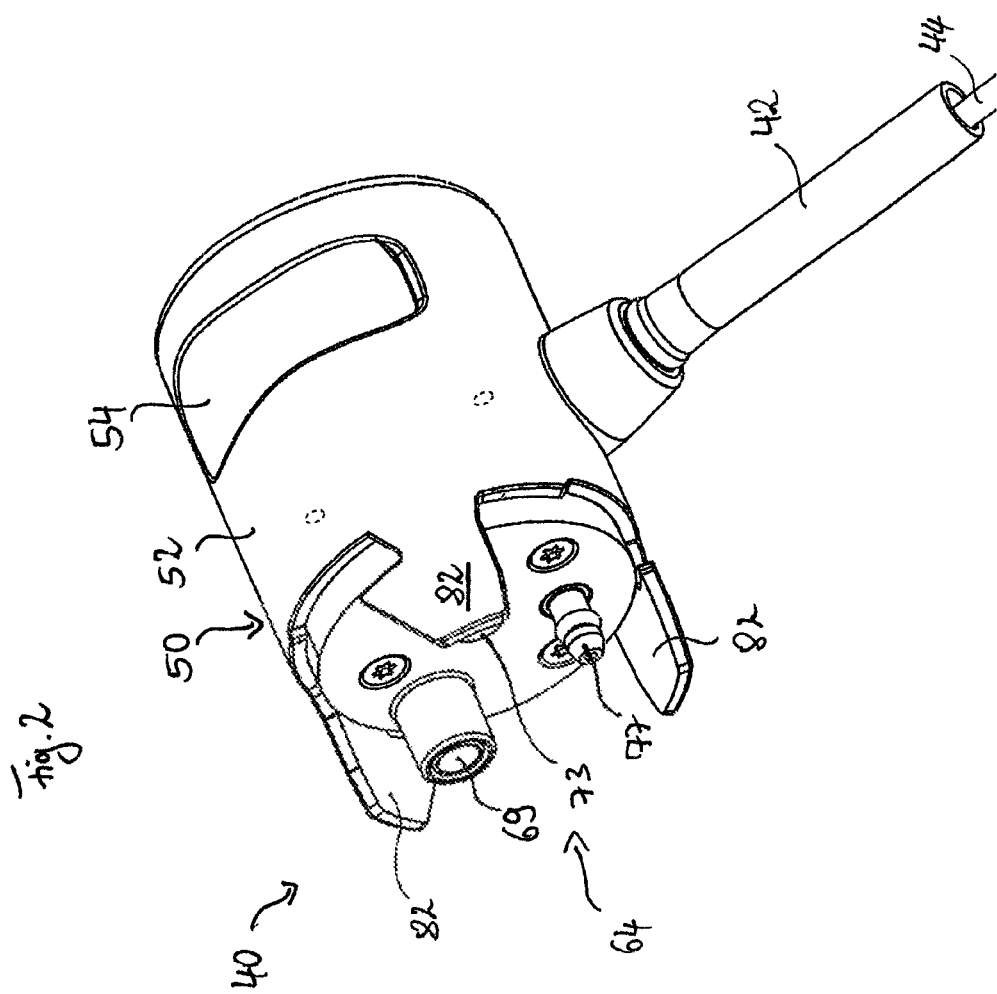
FIG. 2 shows a perspective view of an example of an embodiment of an inventive joining unit.
Figure 7:
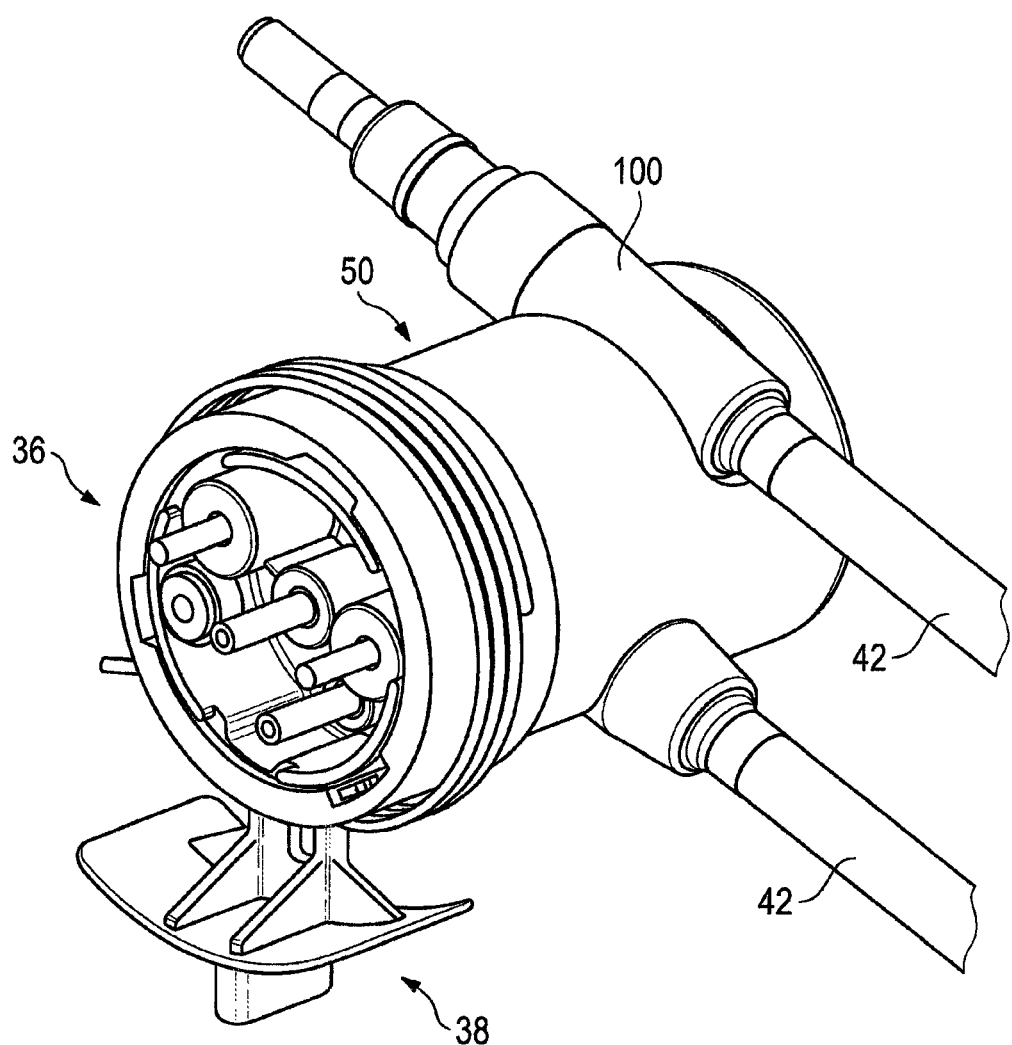
FIG. 7 shows a perspective view of the unit according to FIG. 6 including a handpiece.

As is shown particularly in FIGS. 2 and 7, the housing 52 of joining unit 40 comprises a holding section 54 for the handpiece 100. The holding section 54 is formed as a recess in housing 52 and preferable maintains a positive fit for the handpiece 100.

Figure 8:
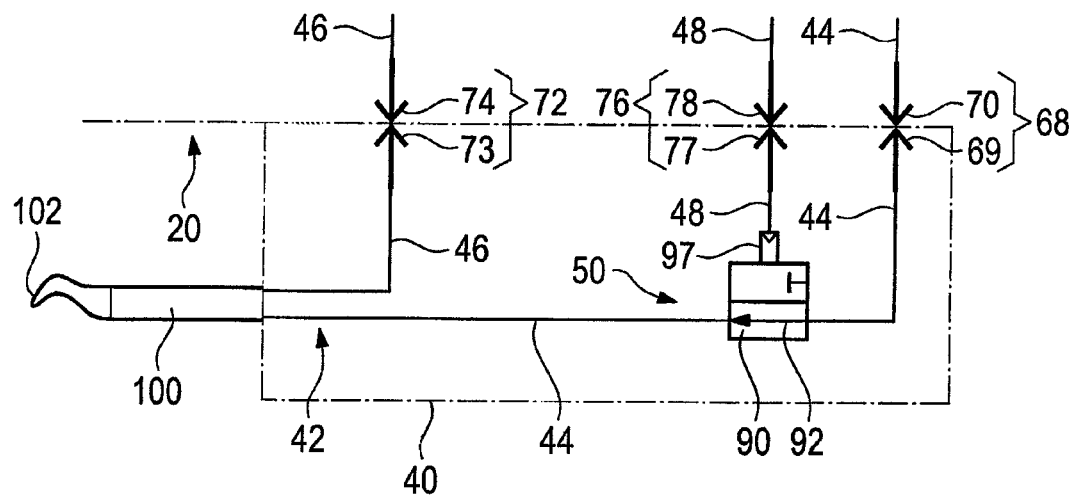
FIG. 8 shows a schematic view of components of an inventive powder-blasting device.

FIG. 8 abstractly illustrates the interaction of stationary unit 20, joining unit 49 and handpiece 100. The joining unit 40, which can be disconnected from stationary unit 20, is supplied with a powder-gas mixture via powder-gas line 44 and with a liquid via liquid line 36. The powder-gas mixture and the liquid are used in the treatment of the patient, i.e. to clean the patient's teeth, and are conducted toward handpiece 100. In addition, the disconnectable joining unit 40 is supplied with a compressed gas (compressed air) via control fluid line 48 which leads to pinch valve 90 which it serves to operate/activate. The already described couplings 68, 72 and 76 are disposed at the interface of stationary unit 20 and joining unit 40.

The invention claimed is:

1. A powder-blasting device for cleaning dental surfaces by applying a powder-gas mixture, comprising:
  a stationary unit with a connecting section for a mixing chamber for producing the powder-gas mixture,
  a handpiece with a nozzle device for blasting the powder-gas mixture onto a dental surface, and
  a joining unit for connecting the handpiece with the stationary unit,
  wherein the joining unit comprises a joining guide, between the stationary unit and the handpiece, and a powder gas line disposed in the joining guide,
  wherein a lockable tube section, lockable by means of elastic deformation, is disposed in the powder gas line between the mixing chamber and the nozzle device,
  wherein the joining unit is detachably connected with the stationary unit, and comprises a housing body that includes a rigid housing for holding and accommodating the lockable tube section, wherein the joining unit comprises a first coupling section for coupling to a corresponding second coupling section of the stationary unit, and the first coupling section is disposed on the housing body of the joining unit such that the housing body of the joining unit is directly detachably connected to the housing of the stationary unit;

wherein a pinch valve is at least partially integrated into the joining unit; and wherein between the stationary unit and the joining unit an air connection is provided for operating the pinch valve.

2. The powder-blasting device according to claim 1, wherein a coupling for a control fluid line is formed between the joining unit and the stationary unit.

3. The powder-blasting device according to claim 1, wherein a line coupling for a liquid line is formed between the joining unit and the stationary unit.

4. The powder-blasting device according to claim 1, wherein a line coupling for a powder-gas line or a line coupling for a compressed air line to the mixing chamber is formed between the joining unit and the stationary unit.

5. The powder-blasting device according to claim 1, wherein the mixing chamber forms one unit with the lockable tube section, and wherein this unit is interchangeably coupled with the stationary unit.

6. The powder-blasting device according to claim 1, wherein the joining unit comprises a control space for a pressurized control fluid and/or a control element for blocking the tube section.

7. The powder-blasting device according to claim 6, wherein the control element is housed in the stationary unit and engages in or acts upon the joining unit to lock the tube section.

8. The powder-blasting device according to claim 1, wherein the stationary unit comprises a control arrangement for regulating the control fluid.

9. The powder-blasting device according to claim 8, wherein the control arrangement comprises a controllable magnetic valve.

10. The powder-blasting device according to claim 1, wherein an unlocking arrangement is provided for targeted unlocking of the connection between the joining unit and the stationary unit.

11. Joining unit for a powder-blasting device for cleaning dental surfaces by applying a powder-gas mixture, wherein the joining unit is designed to connect a handpiece of the powder-blasting device with a stationary unit of the powder-blasting device, and wherein the joining unit is provided with a joining guide to be arranged between the stationary unit and the handpiece, the joining unit comprising, a first coupling section for the detachable connection with a corresponding second coupling section of the stationary unit and a powder-gas line for conducting a powder-gas mixture, with a tube section lockable by means of elastic deformation and a housing body for holding and accommodating the lockable elastic tube section, wherein the housing body comprises a rigid housing for this, wherein the first coupling section is disposed on the housing body of the joining unit such that the housing body of the joining unit is directly detachably connected to a housing of the stationary unit;

wherein a pinch valve is at least partially integrated into the joining unit; and wherein between the stationary unit and the joining unit an air connection is provided for operating the pinch valve.

12. A powder-blasting device for cleaning the surfaces of teeth by applying a powder-gas mixture, comprising a stationary unit with a connecting section for a mixing chamber for producing the powder-gas mixture, a handpiece with a nozzle device for blasting the powder-gas mixture onto the surface of teeth, and a joining unit for connecting the handpiece with the stationary unit, wherein the joining unit has at least one joining guide between the stationary unit and the handpiece, wherein a tube section lockable by means of elastic deformation is disposed in a powder-gas line between the mixing chamber and the nozzle device, wherein the joining unit is detachably connected with the stationary unit by means of a first coupling section for coupling to a corresponding second coupling section of the stationary unit and comprises a housing body wherein the housing body comprises a rigid housing, and wherein the first coupling section is provided at the housing body of the joining unit and is directly detachably connected to the housing of the stationary unit, the device further comprising means to regulate passage of a liquid through the joining unit;

wherein a pinch valve is at least partially integrated into the joining unit; and wherein between the stationary unit and the joining unit an air connection is provided for operating the pinch valve.

13. The powder-blasting device according to claim 12, wherein the means for regulating the liquid passage comprise at least one electrical or pneumatic valve disposed in the detachable joining unit or in the stationary unit.

14. The powder-blasting device according to claim 13, wherein the pneumatic valve is controlled via a control peg housed in the stationary unit.

* * * * *